United States Patent [19]

Sankrithi

[11] Patent Number: 4,511,143
[45] Date of Patent: Apr. 16, 1985

[54] ELECTRONIC MAZE GAME

[76] Inventor: Mithra M. K. V. Sankrithi, 417 Bellevue Way SE. #400, Bellevue, Wash. 98004

[21] Appl. No.: 409,937

[22] Filed: Aug. 20, 1982

[51] Int. Cl.$^3$ ............................................. A63F 9/06
[52] U.S. Cl. .............................. 273/153 R; 273/237; 273/242; 273/275; 273/287
[58] Field of Search ............ 273/153 R, 1 GA, 1 GC, 273/237, 242, 275, 287, DIG. 28

[56] References Cited

U.S. PATENT DOCUMENTS

| | | | |
|---|---|---|---|
| 3,712,617 | 1/1973 | Ohlschlaver | 273/153 R |
| 3,888,491 | 3/1975 | Bernard et al. | 273/237 |
| 4,089,524 | 5/1978 | Hauck | 273/DIG. 28 |
| 4,103,895 | 8/1978 | Pressman et al. | 273/153 R |
| 4,126,851 | 11/1978 | Okor | 273/DIG. 28 |
| 4,170,354 | 10/1979 | Bredlau | 273/153 R |
| 4,182,514 | 12/1979 | Magid | 273/237 |
| 4,240,638 | 12/1980 | Morrison et al. | 273/1 GA |
| 4,288,537 | 9/1981 | Knetzger | 273/1 GA |
| 4,311,310 | 1/1982 | Dankman et al. | 273/153 R |
| 4,323,242 | 4/1982 | Rosenfeld | 273/1 GC |

OTHER PUBLICATIONS

Martin Gardner, *The 2nd Scientific American Book of Mathematical Puzzles and Diversions*, 1961, pp. 112-118.
David H. Ahl, *More Basic Computer Games*, 9/75, pp. 101-103.

*Primary Examiner*—Richard C. Pinkham
*Assistant Examiner*—Leo P. Picard

[57] ABSTRACT

This invention provides an electronic maze game apparatus. The basic invention comprises a display board, optical discrete display elements (such as LCDs or LEDs) forming a grid on the display board, and electronic control for the selective display of the optical display elements so that a maze pattern is displayed and made visible on the display board. The maze pattern may be solved by the user directing a position marker through the maze, through control panel inputs. Information defining a multiplicity of maze patterns may be stored in a memory, and any of these patterns may be displayed, as directed by the user.

26 Claims, 6 Drawing Figures

ELECTRONIC MAZE GAME

SUMMARY OF THE INVENTION

The solution of maze or labyrinth problems has been an intellectually stimulating recreational pastime for centuries.

This invention provides a new game device with a display board on which an electronically produced maze pattern may be displayed. Any of a plurality of memory stored maze patterns may alternatively be displayed.

The availability for display and solution of a plurality of maze patterns, some of which may be more challenging to solve than others, is an advantage of the invention.

The fact that embodiments of the invention can be made which are easily portable, is another advantage of the invention.

Further advantages and objects of the invention will become apparent from a complete consideration of this specification and the accompanying drawings.

DETAILED DESCRIPTION

Figure 1:
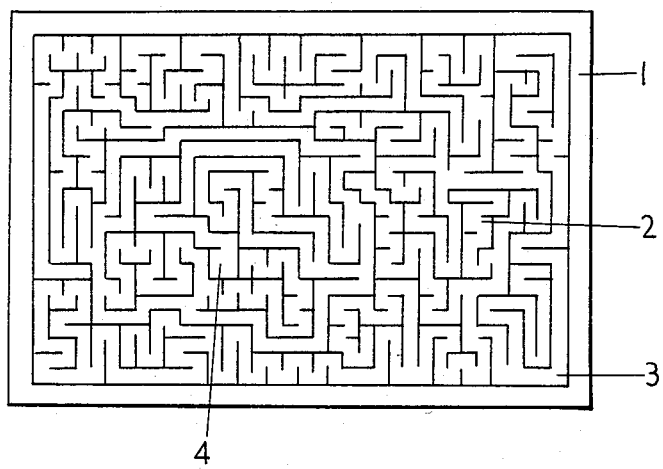
FIG. 1 shows a basic embodiment of the electronic maze game invention.

FIG. 1 shows a basic embodiment of the invention. Here the peripheral part of a display board 1 can be seen. The display board may be made using any of a variety of materials. A maze pattern 2 is displayed and made visible on said display board 1 by electronic means selectively displaying optical display elements forming a grid on said display board 1. The optical display elements may, for example, be liquid crystal display (LCD) elements or light-emitting diode (LED) elements. The electronic means may include a memory which stores information defining the maze pattern, and means for translating this information into the actual display of the maze pattern. A variety of particular hardware and software means could be used in the said electronic means, within the scope of the invention. While it is obvious that a variety of alternative maze patterns could be displayed, within the scope of the invention, the particular maze pattern illustrated here is that of a garden maze of the British mathematician W. W. Rouse Ball, as cited in *The 2nd Scientific American Book of Mathematical Puzzles & Diversions,* by Martin Gardner, published by Simon and Schuster, New York, 1961. For this particular maze the starting point is at the location designated 3 and the goal is at the location designated 4. Again, alternative mazes of different sizes and complexity are clearly possible. The physical size of the entire electronic maze game invention can also be varied to a considerable extent, within the scope of the invention. A transparent cover element, on which lines may be marked and erased, may be installed over the grid of optical display elements. The user can then attempt to solve the maze by drawing paths on this transparent cover element.

Figure 2:
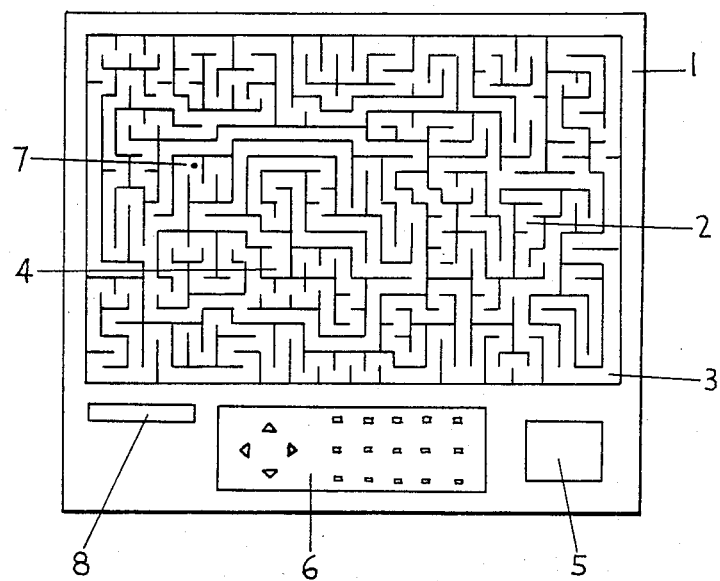
FIG. 2 shows a more sophisticated embodiment of the electronic maze game invention.
Figure 3A:
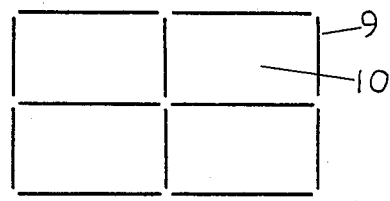
FIGS. 3a, 3b, 3c and 3d shows four types of grids formed by optical display elements.
Figure 3B:
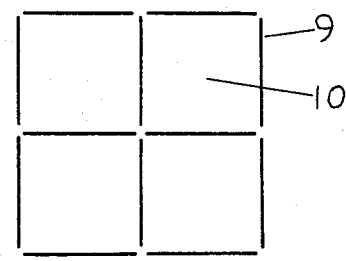
Figure 3C:
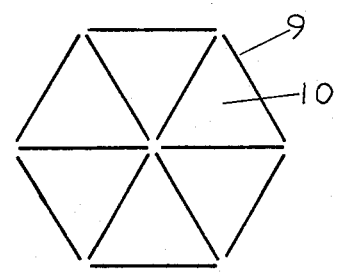
Figure 3D:
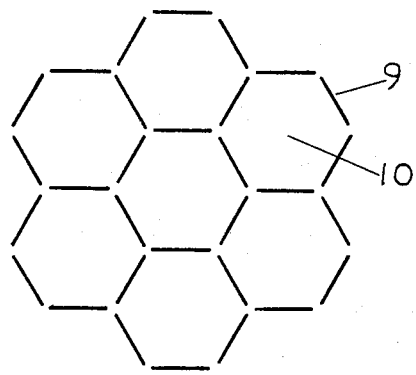

FIG. 2 shows an embodiment of the invention with some additional features. Here a memory module 5 is provided which is physically detachable from the body of the electronic maze game invention. Note here that any memory in the invention may be a read only memory (ROM), a random access memory (RAM), or some other type of memory. Any memory in this invention may also store information defining more than one maze pattern.

The embodiment of FIG. 2 is also provided with a control panel 6, which provides a means for user interface with the invention. The control panel may be fitted with one or more buttons, touch sensors, knobs, dials, slide controls, and/or joysticks. Preferably a keyboard will be provided on the control panel, with buttons or touch sensors. The control panel may be used by the user to select a given maze pattern for display. Another possible use of the control panel involves commanding the display of a position marker 7. In this embodiment additional optical display elements are provided in the interstitial blocks of the grid, and the position marker 7 is produced by the display of one of these additional optical display elements. Now the user may press up-/down/left/right "move" buttons which will cause the position marker to effectively move up, down, left, or right, by causing the appropriate adjacent additional optical display element to be displayed in place of the additional optical display element formerly associated with the position marker. Electronic means for forbidding movement of the position marker across boundaries of the displayed maze pattern can be provided. Therefore in this embodiment the user can attempt to solve the maze by pressing the "move" buttons in some appropriate time sequence (or by operating a joystick or other control means) so as to cause the position marker to move through the maze, hopefully from the starting point to the goal. An alternative "move" command may move the position marker, but cause the additional optical display element corresponding to the former position of the position marker to continue to be displayed. In this way a space sequence or visible path of additional optical display elements can be built through the maze. Optionally, when the position marker is made to retrace its path, the retraced portion display may be "erased". Several other variations and alternative games may also be implemented using the device invented here.

The embodiment of FIG. 2 is finally also provided with a digital display 8. This display may display the identifying alphanumeric code of the maze pattern currently displayed; or the number of steps taken or the time elapsed from the start to the finish of the maze solution.

One more interesting possible variant of the invention incorporates means for producing a time varying maze pattern display. The maze pattern may be varied in a predetermined manner governed by some algorithm, or in some random manner. In this way an additional element of excitement and difficulty can be added to the solution of the maze.

FIG. 3 shows a variety of grids formed by optical display elements, which grids may be used in alternative embodiments of the invention. Several different grids may also be superposed in a single embodiment of the invention. All the optical display elements are visible here to more clearly illustrate the grid patterns- note that only selected optical display elements will be visible in any given maze pattern display. Note that optical display elements with width to length ratios larger than those shown here may be used in the invention. FIG. 3a shows a rectangular grid. FIG. 3b shows a square grid. FIG. 3c shows a triangular grid. FIG. 3d shows a hexagonal grid. In each of these four illustrations, one of the optical display elements is designated 9, and one of the interstitial blocks of the grid is designated 10. Numbering is not applied to all of the optical display elements nor to all of the interstitial blocks of the grids, to keep the illustrations from getting too cluttered. Note that any two-dimensional space filling regular polygonal grid pattern may be used in the invention. A variety of other grids may also be used in the invention.

The power supply for the invention will preferably be an electric power supply. One or more batteries or household AC power may be used. If one or more batteries are used, means for battery recharging may also be provided.

While certain preferred embodiments of the invention have been described in detail above, it is to be understood that further modifications and variations can be made within the scope of the invention as defined in the appended claims.

What is claimed is:

1. A game apparatus comprising a display board;
   discrete optical display elements forming a grid on said display board and bounding sides of intersticial blocks with said grid, with electronic means for selectively displaying said optical display elements so that a maze pattern is displayed on said display board;
   and additional discrete optical display elements in the interstitial blocks of said grid, with user operable means for selectively displaying said additional optical display elements.

2. The game apparatus of claim 1, wherein said optical display elements are light-emitting diode elements.

3. The game apparatus of claim 1, wherein said optical display elements are liquid crystal display elements.

4. The game apparatus of claim 1, wherein said optical display elements are elongated optical display elements.

5. The game apparatus of claim 1, wherein said grid is a rectangular grid.

6. The game apparatus of claim 5, wherein said grid is a square grid.

7. The game apparatus of claim 1, wherein said grid is a space filling regular polygonal grid.

8. The game apparatus of claim 1, further comprising control panel means for permitting user inputs.

9. The game apparatus of claim 1, wherein said electronic means includes a memory which stores information defining said maze pattern.

10. The game apparatus of claim 9, wherein said memory is a read only memory.

11. The game apparatus of claim 9, wherein said memory is a random access memory.

12. The game apparatus of claim 9, wherein said memory is contained in a memory module which is physically detachable from the rest of the said game apparatus.

13. The game apparatus of claim 9, wherein said electronic means includes means for translating
   said information defining said maze pattern in said memory into
   the actual display of said maze pattern on said display board.

14. The game apparatus of claim 9, wherein said memory stores information defining a plurality of maze patterns including the said maze pattern.

15. The game apparatus of claim 14, with user operable means for selecting any of the said plurality of maze patterns for display on said display board.

16. The game apparatus of claim 1, wherein said electronic means are powered by an electric power supply.

17. The game apparatus of claim 1, further provided with digital display means.

18. The game apparatus of claim 1, further provided with means for timing the solution of the maze.

19. The game apparatus of claim 1, wherein said maze pattern is a time varying maze pattern.

20. The game apparatus of claim 1, wherein a maze generating algorithm is contained in said electronic means.

21. The game apparatus of claim 1, with user operable means for designing said maze pattern prior to the display of said maze pattern on said display board.

22. The game apparatus of claim 1, further comprising a transparent cover element above said optical display elements and said additional optical display elements.

23. The game apparatus of claim 1, wherein said grid is a hexagonal grid.

24. The game apparatus of claim 1, wherein said user operable means include user operable means for selectively displaying one of the said additional optical display elements to serve as a current position marker in said maze pattern.

25. The game apparatus of claim 24, with electronic means for forbidding movement of said current position marker across boundaries of said maze pattern.

26. The game apparatus of claim 1, wherein said user operable means comprise user operable means for selectively and sequentially displaying said additional optical display elements along allowable paths through said maze pattern.

* * * * *